UNITED STATES PATENT OFFICE.

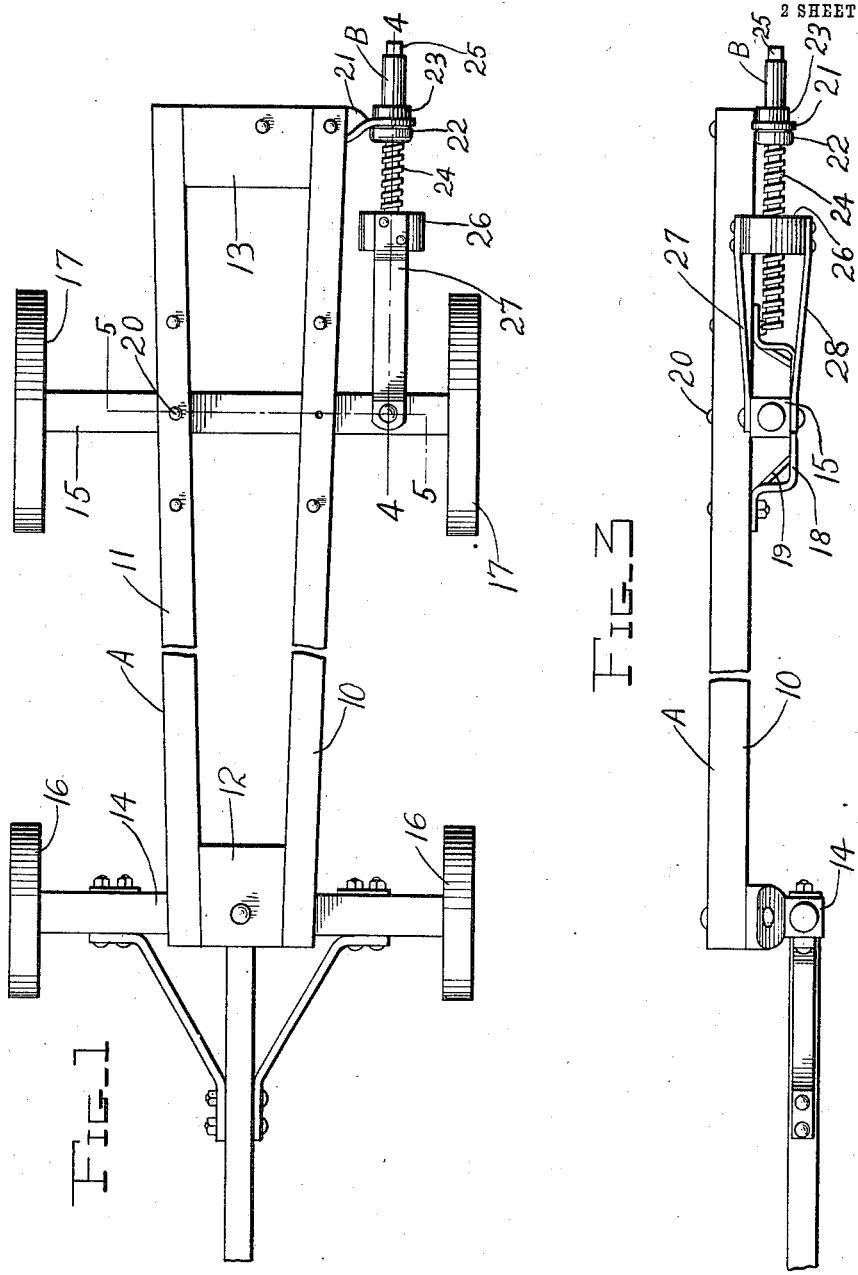

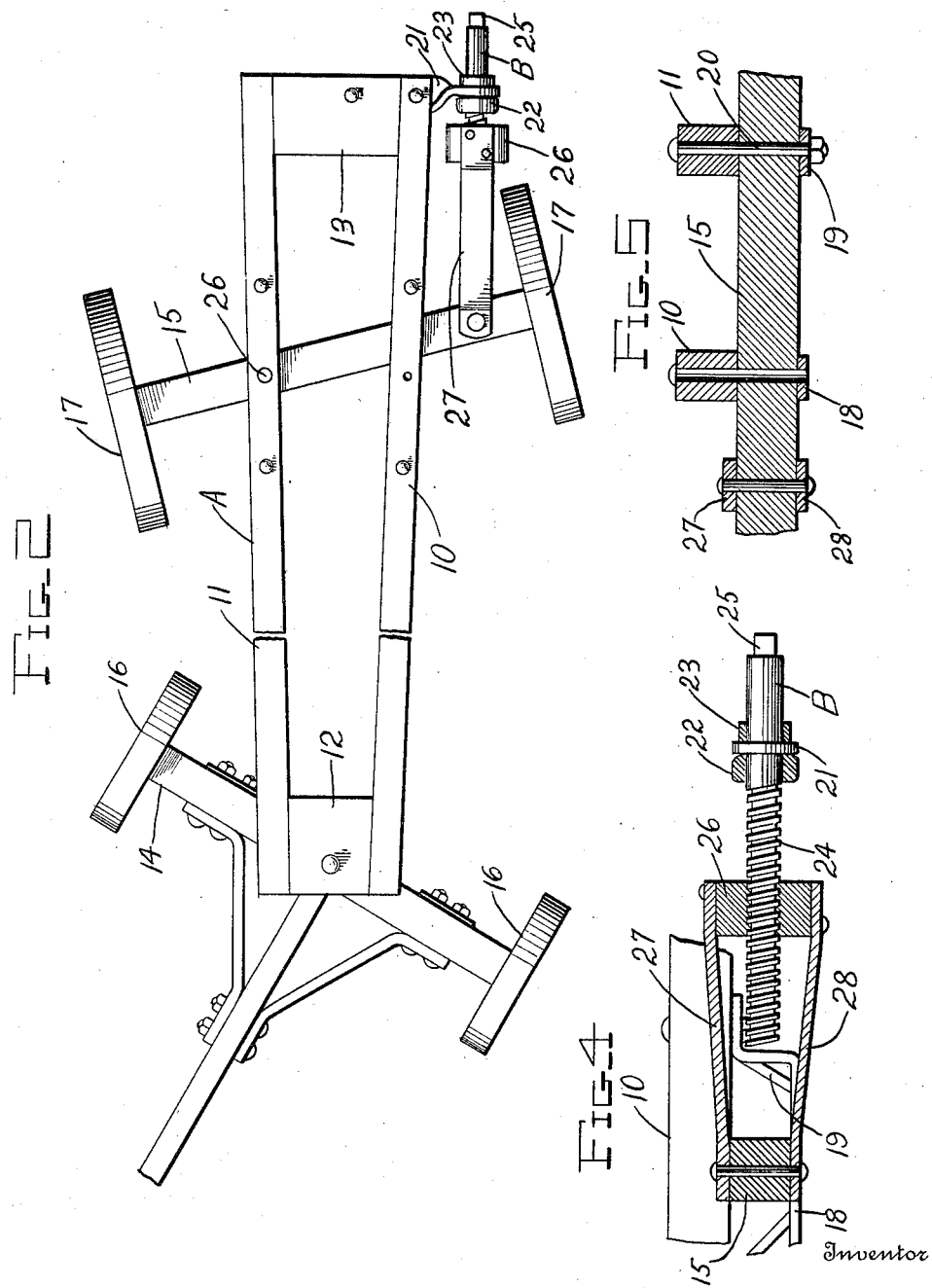

FRED I. D. HAGENAH, OF STOVER, MISSOURI.

RUNNING-GEAR FOR VEHICLES.

1,030,726.  Specification of Letters Patent.  Patented June 25, 1912.

Application filed June 26, 1911. Serial No. 635,508.

*To all whom it may concern:*

Be it known that I, FRED I. D. HAGENAH, a citizen of the United States, residing at Stover, in the county of Morgan, State of Missouri, have invented certain new and useful Improvements in Running-Gear for Vehicles; and I do hereby declare the following to be a full, clear, and exact description of the invention, such as will enable others skilled in the art to which it appertains to make and use the same.

This invention relates to running gear for vehicles.

The object of the invention resides in so constructing the running gear of a vehicle that the rear wheels thereof may be adjusted when making a turn so as to follow substantially in the track of the front wheels and thus impart a forward movement to the rear of the vehicle while the forward portion of the vehicle is swinging at an angle to the line of travel previous to the institution of the turning.

With the above and other objects in view the invention consists in the details of construction and in the arrangement and combination of parts to be hereinafter more fully described and particularly pointed out in the appended claim.

In describing the invention in detail, reference will be had to the accompanying drawings, wherein like characters of reference denote corresponding parts in the several views, and in which—

Figure 1 is a plan view of a vehicle with the improved running gear associated therewith, the body of the vehicle being removed, and the rear axle adjusted for straight running, Fig. 2 a view similar to Fig. 1 showing the various parts of the running gear in the position they would occupy when the vehicle is making a short turn to the right, Fig. 3, a side view of what is shown in Fig. 1 with the wheels of the vehicle removed, Fig. 4, an enlarged section on the line 4—4 of Fig. 1, and Fig. 5, an enlarged section on the line 5—5 of Fig. 1.

Referring to the drawings A indicates the frame of the vehicle which includes side sills 10 and 11 and front and rear connecting portions 12 and 13 respectively. This frame A carries at its front portion a forward axle 14 and at its rear portion, a rear axle 15, the former of which is provided with traction wheels 16 and the latter with traction wheels 17. The axle 14 is pivotally connected to the frame A in the usual manner so as to effect the institution of the turning of the vehicle, all in a well known manner. Suspended from the lower face of the sills 10 and 11 are U-shaped guide brackets 18 and 19 respectively and between the bight portion of these brackets and the lower face of the sills 10 and 11 is mounted the rear axle 15. This rear axle is pivotally mounted at one end by means of a bolt 20 which extends through the sill 11, through the axle, and through the bight portion of the bracket 19 thus leaving the opposite end of the bracket 19 free to swing within the limits of the arms of the bracket 18. Secured to the lower face of the frame A and projecting laterally therefrom on the side adjacent the bracket 18 is a journal bracket 21 in which is rotatably mounted a rod B provided with spaced flanges 22 and 23 by means of which the rod is held against disengagement from the bracket 21. The forward end of this rod B is threaded as at 24 while the rear end thereof is squared as at 25 to permit the ready rotation of the rod through the instrumentality of a wrench or other tool. Mounted on the threaded end of the rod B is a head 26 and connecting this head with the adjacent end of the axle 15 is a pair of straps 27 and 28, the former being fixed to the upper side of the head at one end and pivotally connected to the upper side of the axle at the other end, while the latter is fixed to the lower side of the head at one end and pivotally connected to the lower side of the axle at the other end, a common pivot pin serving to connect both straps to the axle.

By this construction it will be apparent that the continued rotation of the rod B in one direction will move the end of the axle adjacent thereto against the forward arm of the bracket 18, while the continued rotation of said rod in the opposite direction will move the axle 15 against the rear arm of the bracket 18. This adjustment of the axle 15, and of course the wheels associated therewith, will enable the vehicle to reach a trimmed position in making a short turn much more quickly than can be accomplished if the axle 15 were fixed. This result is extremely useful in enabling relatively long vehicles to turn into a gate from a very narrow road. In order to effect a turn to the right the front and rear axles occupy substantially the position shown in Fig. 2 while to effect a turn to the left the positions of said axles with respect to the frame A will be respectively reversed.

What is claimed is:

In a running gear for vehicles, the combination of a vehicle frame, a wheeled front axle pivotally connected to the frame, a wheeled rear axle also pivotally connected to the frame, a journal bracket supported by the frame and projecting laterally therefrom, a threaded rod rotatably mounted in said bracket, a head threaded on said rod, and straps having corresponding ends pivotally connected to said axle on opposite sides of the latter and their other ends secured respectively to opposite sides of the head, whereby the rotation of said rod will move the head longitudinally of the rod and swing the rear axle on its pivot.

In testimony whereof, I affix my signature, in presence of two witnesses.

FRED I. D. HAGENAH.

Witnesses:
H. L. FRISCH,
S. N. NEWTON.

Copies of this patent may be obtained for five cents each, by addressing the "Commissioner of Patents, Washington, D. C."